May 23, 1939. H. A. CARTWRIGHT 2,159,319
DISTRIBUTOR APPARATUS AND GOVERNOR THEREFOR
Filed Sept. 23, 1936 2 Sheets-Sheet 1
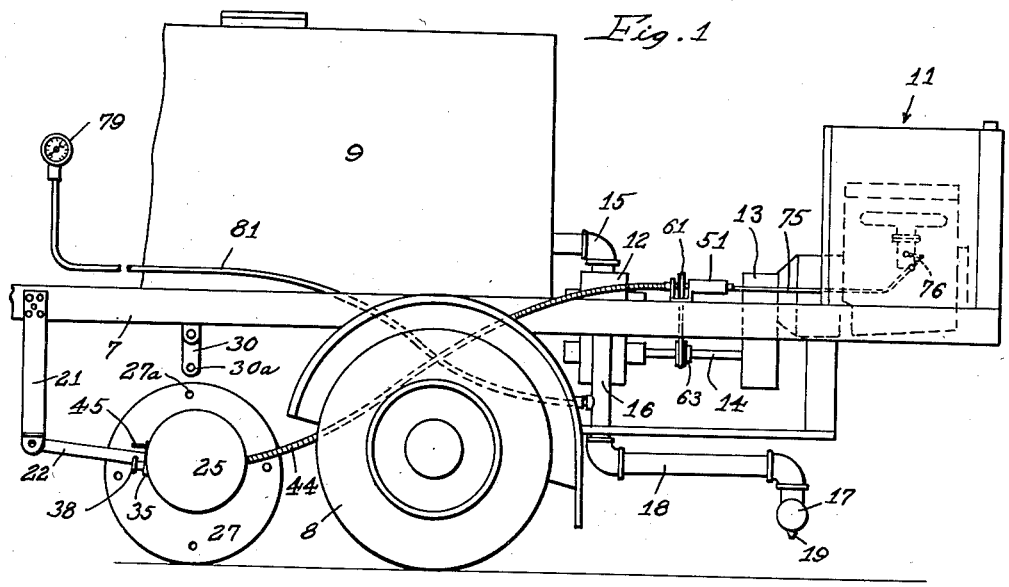
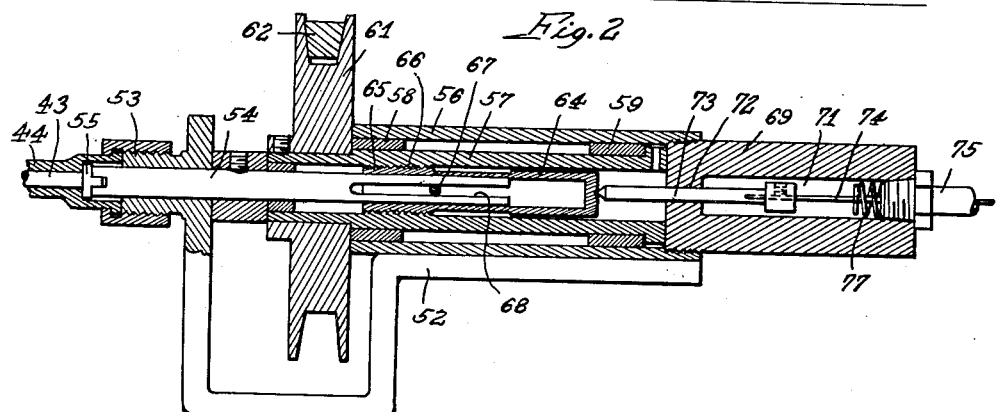
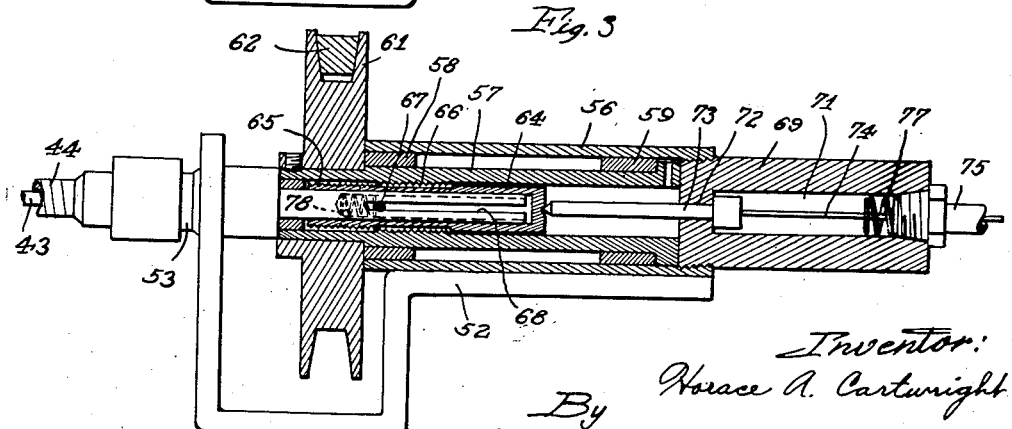
Inventor:
Horace A. Cartwright May 23, 1939.  H. A. CARTWRIGHT  2,159,319
DISTRIBUTOR APPARATUS AND GOVERNOR THEREFOR
Filed Sept. 23, 1936  2 Sheets-Sheet 2
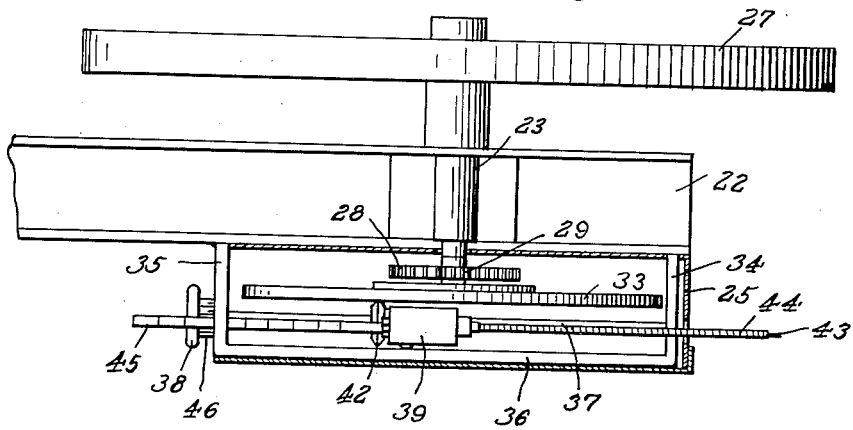
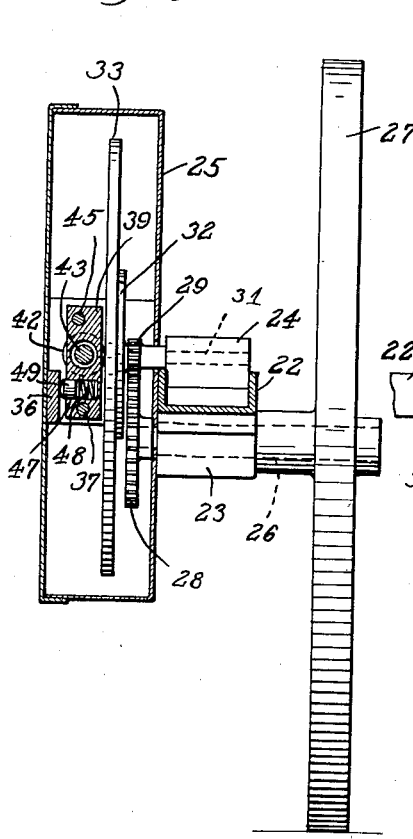
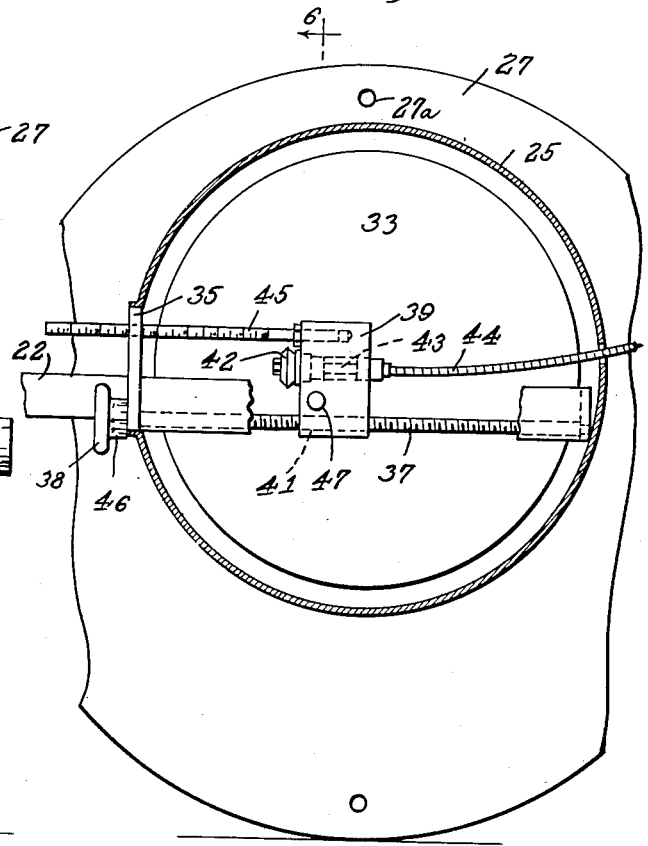
Inventor:
Horace A. Cartwright
By Wilson, Bowell, McCanna & Kintercorn
Attys.

Patented May 23, 1939

2,159,319

UNITED STATES PATENT OFFICE 2,159,319

DISTRIBUTOR APPARATUS AND GOVERNOR THEREFOR

Horace A. Cartwright, Oregon, Ill.

Application September 23, 1936, Serial No. 102,104

18 Claims. (Cl. 299—34)

This invention relates to distributing apparatus of the type commonly employed for the distribution of bituminous materials such as tar, asphalt and oil on roadways and the like, for paving and street surfacing purposes.

The primary object of the invention is the provision of distributing apparatus for more accurately gauging the rate and pressure of distribution, obtaining greater uniformity of distribution under varying conditions, and eliminating a large measure of personal factors effecting the proper distribution of material.

Another object of the invention is the provision of improved governing apparatus for distributors, trailer spraying units, sub-oilers, and the like.

A further object of the invention is the provision of improved governor construction.

Other objects and attendant advantages will become apparent to those skilled in the art from the following description and the accompanying drawings, in which—

Figure 1 is a fragmentary side view of a distributor embodying my invention;

Fig. 2 is a section through the differential regulator forming a part of the invention;

Fig. 3 is a section similar to Fig. 2 showing the parts in moved position;

Fig. 4 is a top view, partly in section, of the fifth wheel assembly forming a part of my invention;

Fig. 5 is a side view, partly in section, showing the fifth wheel assembly, and

Fig. 6 is a section on the line 6—6 of Fig. 5.

Directing attention first to Figure 1, the invention contemplates a vehicle such as a truck frame which is designated by the numeral 7 and the rear wheels by the numeral 8. A tank 9 adapted to contain the material to be distributed is in most cases mounted directly upon the vehicle but may be carried on a separate vehicle traveling with the distributor vehicle, its purpose being to supply material to the pump as the distributor travels. At the rear of the frame 7 is an auxiliary motor 11 connected to drive a pump 12, which is in this instance a gear pump, through transmission 13 and a shaft 14. The intake side of the pump is connected to the tank 9 to a pipe 15 and the delivery side of the pump is connected to a pipe 16 which is connected with the usual distributor bars 17 by means of a pipe 18 and other suitable pipe connections. The distributor bars 17 have spray nozzles 19 thereon in accordance with conventional practice. It will be understood, of course, that other suitable pipe lines may be employed in conformity with conventional practice for the purpose of circulating the material in the tank or for other purposes.

For the purpose of this invention means are provided for driving a governor element in speed responsive relationship with the vehicle which may be driven from any part of the vehicle, the speed of which is proportional to the speed of the vehicle such as the wheels, the drive shaft and the like. In a preferred form of the invention as herein illustrated, a supporting means such as a bracket 21 is attached to the frame of the vehicle so as to depend therefrom and pivotally attached thereto is an arm 22. The arm 22 carries bearings 23 and 24 and a housing 25. Positioned in the bearing 23 is a spindle 26 upon one end of which is attached a wheel 27 adapted to have contact with the roadway upon which the vehicle travels so as to rotate the spindle 26. On the opposite end of the spindle is a gear 28 which meshes with a pinion 29 on a shaft 31 journaled in the bearing 24. On the end of the shaft 31 is a plate 32 to which is attached a disk 33 of friction material similar to that commonly used for molded brake linings for automobiles. Arms 34 and 35 (Fig. 4) are attached to the arm 22 on opposite sides of the bearings 23 and 24 within the housing 25 and project forward to a point near the forward edge of the housing, the two arms being interconnected by a bar 36.

Mounted in the arms 34 and 35 for rotation therein is a screw 37 having a knob 38 for the manual rotation of the screw. A block 39 having a screw-threaded bore 41 is positioned on the screw 37 with the screw passing through the bore 41 so that upon rotation of the screw the block will be caused to travel longitudinally thereof. Rotatably carried on the block 39 is a beveled wheel 42 adapted to bear against the disk 33 so as to be rotated thereby through the frictional engagement between the elements. A flexible shaft 43 is fixed to the wheel 42 and extends out of the housing 25 for a purpose which will presently appear. The flexible shaft is enclosed in an armor 44 in the usual manner. A graduated rod 45 is fixed in the block 39 and projects through the arm 35, as best shown in Fig. 5, the rod carrying graduations such that the distance of the wheel 42 from the center of the disk 33 is indicated by the portion of the rod extending beyond the arm 35. Micrometer readings are made through a scale 46 inscribed on the knob 38. It will be seen that by rotation of the knob 38 the block is moved on the screw 37 and its position with respect to the center of rotation of the disk 33 is indicated on the scales. The block 39 has a recess 47 on its face which receives a spring 48 and a pin 49 adapted for engagement with the bar 36 so that the bar acts to urge the wheel 42 against the disk 33 with a resilient pressure. Through this arrangement the flexible shaft 43 is caused to rotate at any desired fixed speed with respect to the rotation of the wheel 27 so that the rotation of the flexible shaft is a measure of the distance covered by the wheel 27 and also covered by the distributing vehicle. An arm 30 is pivoted to the frame 7 and has an opening 30—a adapted to come into registration with openings 27—a in the wheel 27, when the wheel is raised from the ground so that a pin or bolt may be passed through to hold the wheel off the ground, for use when the vehicle is traveling at relatively high speeds to and from the job.

The flexible shaft 43 and armored enclosing tube 44 are connected to a differential regulator or governor designated generally by the numeral 51 (Figure 1). This regulator consists of a bracket 52 attached to the frame 7 or other suitable means on a stationary part of the vehicle which has a threaded boss 53 for the attachment of the armor tube 44. This boss also provides a bearing for a spindle 54 connected to the flexible shaft 43 by a tongue and groove connection 55, the spindle being rotated by the flexible shaft. The bracket 52 also carries a tube 56 within which is rotatably mounted a sleeve 57 on bearings 58 and 59. One end of the tube 57 has a pulley 61 adapted to be driven by means of a belt 62 from a pulley 63 (Figure 1) on the pump shaft 14 so as to drive the sleeve 57 in a fixed ratio with respect to the pump shaft 14. Within the sleeve 57 is a piston member 64 having an externally threaded portion 65 complemental to an internally threaded portion 66 on the sleeve 57. The threaded portion 65 is positioned at one end of the piston member 64, whereas the threaded portion 66 is positioned at a point intermediate the ends of the sleeve 57 so that the threaded portion 65 may occupy a position within the sleeve 57 at either end and free of the threaded portion 66, one of such positions being shown in Fig. 3. The piston member 64 has a transverse pin 67 receivable in a slot 68 in the end of the spindle 54 and movable in the slot longitudinally of the spindle, the arrangement being such that the piston member is driven with the spindle. It will be observed that the sleeve 57 is driven from the pump shaft 14 and the piston member 64 is rotated from the flexible shaft 43. Assuming that the threaded portions 65 and 66 are in engagement, it will be seen that any difference in the speeds of the pump shaft 14 and the flexible shaft 43 will cause the piston member to move longitudinally within the sleeve 57. A block 69 is positioned in the end of the tube 56 opposite the pulley 61 and has a central opening 71 and a bore 72, the bore carrying a pin 73 projecting into the sleeve 57 and adapted to abut against the end of the piston member 64. A wire 74 is attached to the pin 73 and extends through a pipe 75 to the throttle 76 of the auxiliary motor 11. In the present construction the arrangement is such that the throttle of the motor is opened as the pin 73 moves toward the right facing Figs. 2 and 3 and is closed as the pin moves toward the left. The spring on the throttle tending to close the same is normally of sufficient strength to cause the pin 73 to be maintained against the end of the piston 64 and to cause longitudinal movement of the piston member 64 to the end in so far as will be permitted by the complementary threaded portions. However, if desired, a supplemental spring 77 may be provided to lend additional power for the movement of the piston member 64. A spring 78 is also positioned in a bore of the spindle 54 as shown in Fig. 3 adapted to urge the piston member 64 to the right facing Figs. 2 and 3 so as to maintain the ends of the thread into engagement upon suitable occasion.

It will be seen that with any particular distributor the amount of material delivered by the pump at each revolution will be known, and it will therefore be known the number of revolutions of the pump required to deliver a predetermined amount of material through the spray bars per unit of area or per unit of travel of the vehicle. The knob 38 on the fifth wheel device is therefore set so that it will rotate the flexible shaft 43 the required number of pump revolutions per unit of distance. Therefore, as the vehicle travels over the road bed the flexible shaft 43 and therefore the piston member 64 will be rotated at the same speed as the required pump speed. At the same time the engine 11 is driving the pump and through the pump driving the sleeve 57. If this sleeve and consequently the pump is traveling at a different speed from that of the piston member 64 which is the required speed, then the piston 64 will be moved longitudinally of the sleeve 57 by interaction of the threaded portions 65 and 66. This will cause an increase or decrease in the speed of the motor thereby adjusting the speed of the pump to the speed of the flexible shaft 43. For this reason in a given unit of vehicle movement a given predetermined number of pump revolutions will be caused to occur regardless of the speed at which the vehicle moves within the capacity of the pump, and therefore a given predetermined volume of material will be discharged by the pump.

With this arrangement it will be observed, however, that the pressure on the material at the spray bars will vary directly with the speed of the vehicle. This furnishes a means for regulating the pressure at which the material is sprayed onto the roadway. For this purpose a pressure gauge designated generally by the numeral 79 is placed in the cab of the truck or vehicle within the view of the operator and is connected to the distributing system at a point between the outlet of the pump 12 and the distributor bars 17, as for example, in the pipe 16 by means of a pipe 81 in the conventional manner, so that the pressure in the pipe 16 will be indicated on the dial of the pressure gauge 79. Through this means the operator may regulate the pressure of application by regulating the speed at which the vehicle is caused to move over the road bed.

Attention is directed to the numerous advantages of my improved construction and the improved results obtained thereby. In the conventional practice a governor has been used on the auxiliary engine of a nature which merely limits the maximum speed thereof but which permits of a variation in the minimum speed, the speed in a large measure varying with the load on the pump. In the present instance, instead of using a governor on the auxiliary engine to maintain a given pump speed and then driving the truck at a speed to give the correct distribution, the speed of the pump is varied with the truck speed so that as the speed of the truck increases, the amount of material delivered by the pump increases in the same ratio whereby a given amount of material is discharged per square yard of travel, regardless of the speed of the truck so long as this speed is within the capacity of the pump. In other words, the ratio between pump speed and vehicle speed required to pump a given amount of material per yard of travel is figured and the governor is set at this ratio, which ratio the governor accurately maintains even though the speed of the truck varies. Thus truck speeds do not have to be held exactly as the governor synchronizes the truck speed and the pump speed. This means not only uniform distribution throughout a single distributing run, but it means that spraying can be started at much lower truck speeds without delivering excess material.

Another advantage of the construction lies in the fact that it permits the spraying pressure to be directly regulated since predetermined spraying pressures may be maintained by driving the truck at a speed at which the gauge in the cab shows the required pressure.

Another advantage lies in the fact that highway engineers or inspectors may more accurately control the work of the distributor crews and may do away with the practice of "averaging out". In this practice the distributor is started over a run, the driver attempting to maintain a speed at which all of the material in the tank will be discharged in a predetermined distance of travel. Frequently after covering possibly half of the distance the driver finds that more or less than half of the material in the tank has been discharged and thereupon modifies his speed so as to make the tank full of material cover the required distance. Under these circumstances too much material has been applied to one part of the stretch and too little to another part. However, the engineer or inspector has no means for knowing whether this practice of "averaging out" has been resorted to or not unless he rides directly in the cab of the distributor. By the use of this invention the governor is set at the beginning to distribute a predetermined gallonage per unit of area and this cannot be varied by the operator while the distributor is in operation.

Another advantage lies in the fact that the rate per square yard of distribution is in no wise dependent upon the speed of the truck, the accuracy of the tachometer or upon the ability of the driver to accurately read and follow the tachometer. It is in no wise dependent upon the pump wear in the machines, which cannot be taken care of by the usual tachometer charts. There are some errors in tachometers themselves and considerable error in reading them. Furthermore, the errors multiply themselves where two tachometers are used, one on the pump and one in the cab. Other errors are introduced in that governors of the type heretofore used on auxiliary engines do not maintain exact engine speeds under heavy loads and poor engine performance. All of these errors are eliminated by the use of the present invention.

While I have thus described and illustrated my specific embodiment of the invention, I am aware that numerous alterations and changes may be made therein without departing from the spirit of the invention, and I do not desire to be limited except as required by the prior art and the scope of the appended claims, in which—

I claim:

1. The combination in a distributing apparatus of a vehicle, a tank for material to be sprayed, a pump for supplying spraying pressure to the material, means for driving the pump, and governor means for causing said driving means to drive the pump at a speed in direct fixed proportion to the speed of the vehicle to distribute a uniform amount of material per unit of travel.

2. The combination recited in claim 1 wherein means are provided for varying said relative speed to predetermine the rate of distribution.

3. The combination in a distributor of a vehicle, a material tank, a distributor pump for discharging material from the tank, means for driving the pump, and means for so controlling such driving means in response to changes in the speed of the vehicle as to increase and decrease the speed of the pump in a fixed ratio with respect to the speed of the vehicle.

4. The combination in a distributor of a vehicle, a material tank, a distributor pump for discharging material from the tank, means for driving the pump, a governor element speed responsive to the pump, a governor element speed responsive to the vehicle, and means for so controlling said driving means in response to difference in speed of said governor elements, as to increase and decrease the speed of the pump with corresponding change in the speed of the vehicle.

5. The combination in a distributor of a vehicle, a material tank, a distributor pump for discharging material from the tank, an engine for driving the pump, a governor element speed responsive to the pump, a governor element speed responsive to the vehicle, and means for so actuating the throttle of said engine in response to difference in speed of said governor elements as to increase and decrease the speed of the pump with corresponding change in the speed of the vehicle.

6. The combination in a distributor of a vehicle, a distributor pump, means for driving said pump, a wheel on said vehicle positioned to be driven by contact with the ground, a governor element driven thereby, a governor element driven from the pump, and means so responsive to a difference in speed of said elements to to control said driving means in such a manner as to directly vary the speed of the pump in response to variations in the speed of said vehicle.

7. A governor for distributors of the type having a vehicle, a distributor pump and means for driving the pump, comprising a wheel on said vehicle positioned to be driven by contact with the ground, a governor element driven thereby and speed responsive thereto, a governor element driven from and speed responsive to said pump, means so responsive to a difference in speed of said elements as to control said driving means in such a manner as to increase and decrease the speed of the pump in response to speed changes of said vehicle to maintain a predetermined speed ratio therebetween, and means for varying the driving relationship between said wheel and the governor element driven thereby to vary said predetermined speed ratio.

8. A governor for distributors of the type having a vehicle, a distributor pump and means for driving the pump, comprising a rotatable sleeve member having an internally threaded portion, a shaft member positioned axially therein, means for rotating one of said members in speed responsive relation to said vehicle, means for rotating the other member in speed responsive relation with said pump, a piston within said sleeve rotated by said shaft member and having an externally threaded portion for engaging with said internally threaded portion to produce longitudinal movement of said piston upon a difference in the speed of rotation of said elements, and means for so controlling said driving means in response to longitudinal movement of said piston as to increase and decrease the speed of the pump in response to speed changes in said vehicle to maintain a predetermined speed ratio therebetween.

9. The combination in a distributor for paving materials and the like having a vehicle, of a governor wheel assembly comprising a fifth wheel pivotally attached to the vehicle and adapted to roll along the ground with movement of the vehicle, a friction disk driven by said wheel, a friction wheel supported for frictional driving contact with said disk, and means for transmitting the rotation of the friction wheel to a remote point to govern the operation of the distributor.

10. The combination in a distributor for paving materials and the like having a vehicle, of a governor wheel assembly comprising a fifth wheel pivotally attached to the vehicle and adapted to roll along the ground with movement of the vehicle, a friction disk driven by said wheel, a friction wheel supported for frictional driving contact with said disk, means for adjusting the radial position of said friction wheel on said disk to predetermine the speed ratio between the friction wheel and the fifth wheel, and means for transmitting the rotation of the friction wheel to a remote point to govern the operation of the distributor.

11. The combination in a distributor for paving materials and the like having a vehicle, of a governor wheel assembly comprising a fifth wheel pivotally attached to the vehicle and adapted to roll along the ground with movement of the vehicle, a friction disk driven by said wheel, a friction wheel supported for frictional driving contact with said disk, means for adjusting the radial position of said friction wheel on said disk to predetermine the speed ratio between the friction wheel and the fifth wheel, means for transmitting the rotation of the friction wheel to a remote point to govern the operation of the distributor, and means for indicating the radial position of said friction wheel to indicate the speed ratio between the fifth wheel and the transmitting means.

12. The combination in a distributor for paving materials and the like having a vehicle of a governor wheel assembly comprising a fifth wheel pivotally attached to the vehicle and adapted to roll along the ground with movement of the vehicle, a friction disk driven by said vehicle, a friction wheel, a block for carrying said wheel, a screw carrying said block for radial adjustment of said block and said wheel with respect to said disk to predetermine the speed ratio between the wheel and the disk, means acting on said block for urging said wheel into resilient driving contact with said disk, and means for transmitting the rotation of the friction wheel to a remote point to govern the operation of the distributor.

13. A governor for distributors of paving materials and the like having a vehicle, a distributor pump, and means for driving said pump, comprising a rotatable sleeve member having an internal threaded portion spaced from its ends, a rotatable piston member arranged for longitudinal movement and positioned within said sleeve member, said piston member having a threaded portion arranged for engagement with the threaded portion of said sleeve member intermediate the ends of said movement and for disengagement at the ends of said movement, means for rotating one of said members in speed responsive relationship with said pump, means for driving the other member in speed responsive relationship with said vehicle, and means to so control the speed of the pump in response to the longitudinal movement of said piston member as to vary the speed of the pump in direct ratio with change in the speed of the vehicle.

14. A governor for distributors of paving material and the like having a vehicle, a distributor pump, and an engine for driving said pump, comprising a rotatable sleeve member having an internal threaded portion spaced from its ends, a rotatable piston member arranged for longitudinal movement and positioned within said sleeve member, said piston member having a threaded portion arranged for engagement with the threaded portion of said sleeve member intermediate the ends of said movement and for disengagement at the ends of said movement, means for rotating one of said members in speed responsive relationship with said pump, means for driving the other member in speed responsive relationship with said vehicle, and a push member connected to the throttle of said engine and arranged to bear against said piston member to so actuate the throttle in response to a change in the relative speed of said members as to drive said pump in a predetermined speed ratio with respect to said vehicle.

15. A governor for distributors of paving materials and the like having a vehicle, a distributor pump, and means for driving said pump, comprising a rotatable sleeve member having an internal threaded portion spaced from its ends, a rotatable piston member arranged for longitudinal movement and positioned within said sleeve member, said piston member having a threaded portion arranged for engagement with the threaded portion of said sleeve member intermediate the ends of said movement and for disengagement at the ends of said movement, said piston member being hollow and having a transverse pin, a shaft positioned within said piston member having a slot for reception of said pin to rotate said member with longitudinal movement of the member, means for rotating said shaft in speed responsive relationship to the vehicle, means for rotating said sleeve member in speed responsive relationship with said pump, and means to so control the speed of the pump in response to the longitudinal movement of said piston member as to vary the speed of the pump in direct ratio with change in the speed of the vehicle.

16. The combination with two driven elements and means for driving the same, of a governor for synchronizing the speed of said elements comprising a rotatable sleeve member having an internally threaded portion, a shaft member positioned axially therein, means for rotating said members in speed responsive relation to said driven elements, a piston within said sleeve rotated by said shaft member and having an externally threaded portion for engagement with said internally threaded portion to produce longitudinal movement of said piston upon a difference in the speed of rotation of said elements, and means for controlling the driving means for one of said elements in response to longitudinal movement of said piston to increase and decrease the speed thereof in response to speed changes of the other of said elements to maintain said elements in synchronization.

17. The combination with two driven elements and means for driving the same, of a governor for synchronizing the speed of said elements comprising a rotatable sleeve member having an internally threaded portion spaced from its ends, a rotatable piston member arranged for longitudinal movement and positioned within said sleeve member, said piston member having a threaded portion arranged for engagement with the threaded portion of said sleeve member intermediate the ends of said longitudinal movement and for disengagement at the ends of said movement, means for rotating one of said members in speed responsive relationship with one of said elements, means for driving the other member in speed responsive relationship with the other of said elements, and means to control the driving means for one of said elements in response to the longitudinal movement of said piston member whereby to vary the speed of one of said elements with change in the speed of the other of said elements.

18. The combination in a distributor of a vehicle, a material tank, spray bars for spraying said material, a distributor pump for pumping said material from the tank through the spray bars, means for driving the pump, a governor element speed responsive to the pump, a governor element speed responsive to the vehicle, means for so controlling said driving means in response to difference in speed of said governor elements as to distribute a uniform amount of material per unit of travel, and a pressure gauge for indicating the pressure between the pump and the spray bars located in view of the vehicle operator, whereby the speed of the vehicle may be controlled to maintain a desired distributing pressure at the spray bars.

HORACE A. CARTWRIGHT.